(12) United States Patent
Miyajima et al.

(10) Patent No.: US 7,631,722 B2
(45) Date of Patent: Dec. 15, 2009

(54) POWER STEERING SYSTEM

(76) Inventors: Ayumu Miyajima, c/o Hitachi, Ltd., Intellectual Property Group, 12th Floor, Marunouchi Center Building, 6-1, Marunouchi 1-chome, Chiyoda-ku, Tokyo 100-8220 (JP); Makoto Yamakado, c/o Hitachi, Ltd., Intellectual Property Group, 12th Floor, Marunouchi Center Building, 6-1, Marunouchi 1-chome, Chiyoda-ku, Tokyo 100-8220 (JP); Toru Takahashi, c/o Hitachi, Ltd., Intellectual Property Group, 12th Floor, Marunouchi Center Building, 6-1, Marunouchi 1-chome, Chiyoda-ku, Tokyo (JP); Naoshi Yamaguchi, c/o Hitachi, Ltd., Intellectual Property Group, 12th Floor, Marunouchi Center Building, 6-1, Marunouchi 1-chome, Chiyoda-ku, Tokyo 100-8220 (JP); Yoshitaka Sugiyama, c/o Hitachi, Ltd., Intellectual Property Group, 12th Floor, Marunouchi Center Building, 6-1, Marunouchi 1-chome, Chiyoda-ku, Tokyo 100-8220 (JP)

( * ) Notice: Subject to any disclaimer, the term of this patent is extended or adjusted under 35 U.S.C. 154(b) by 198 days.

(21) Appl. No.: 11/624,286

(22) Filed: Jan. 18, 2007

(65) Prior Publication Data
US 2007/0205037 A1  Sep. 6, 2007

(30) Foreign Application Priority Data
Mar. 3, 2006 (JP) ............................ 2006-057076

(51) Int. Cl.
*B62D 5/06* (2006.01)

(52) U.S. Cl. ............... 180/442; 180/443; 180/422; 180/420; 180/423; 180/428

(58) Field of Classification Search ............... 180/443, 180/442, 422, 420, 428, 423
See application file for complete search history.

(56) References Cited

U.S. PATENT DOCUMENTS

| 4,552,240 | A | * | 11/1985 | Takeshima et al. | .......... 180/422 |
| 5,711,394 | A | * | 1/1998 | Fujii et al. | .................. 180/422 |
| 6,064,166 | A | * | 5/2000 | Kaji | .......................... 318/489 |

(Continued)

FOREIGN PATENT DOCUMENTS

JP      08-295257      11/1998

(Continued)

OTHER PUBLICATIONS

Hiroshi Ogino, "How to Use Brushless DC Motor", Ohmsha Corp., pp. 16-17.

*Primary Examiner*—Lesley Morris
*Assistant Examiner*—Marlon A Arce
(74) *Attorney, Agent, or Firm*—Crowell & Moring LLP

(57) ABSTRACT

In a power steering system, the steering state of wheels is detected based on the steering speed to judge as to whether the steering state is in turning of the steering wheel or holding of steering speed is the steering wheels. At the time of the steering operation state, the control is executed so that a difference between a torque command value to an electric motor and the actual torque thereof will become smaller. Also, at the time of the holding operation state, the control is executed so that a difference between the revolution speed of the electric motor and a revolution-speed command value thereto will become smaller.

13 Claims, 11 Drawing Sheets

U.S. PATENT DOCUMENTS

| | | | |
|---|---|---|---|
| 6,227,328 B1 * | 5/2001 | Shimizu | 180/422 |
| 6,568,499 B2 * | 5/2003 | Nakazawa et al. | 180/422 |
| 6,886,657 B2 * | 5/2005 | Yokota et al. | 180/422 |
| 7,044,262 B2 * | 5/2006 | Otaki et al. | 180/422 |
| 7,363,134 B2 * | 4/2008 | Mitsuhara | 701/42 |
| 7,387,186 B2 * | 6/2008 | Soeda et al. | 180/422 |
| 7,434,655 B2 * | 10/2008 | Soeda | 180/441 |

FOREIGN PATENT DOCUMENTS

| | | |
|---|---|---|
| JP | 2003-212141 | 7/2003 |
| JP | 2005-349883 | 12/2005 |

* cited by examiner

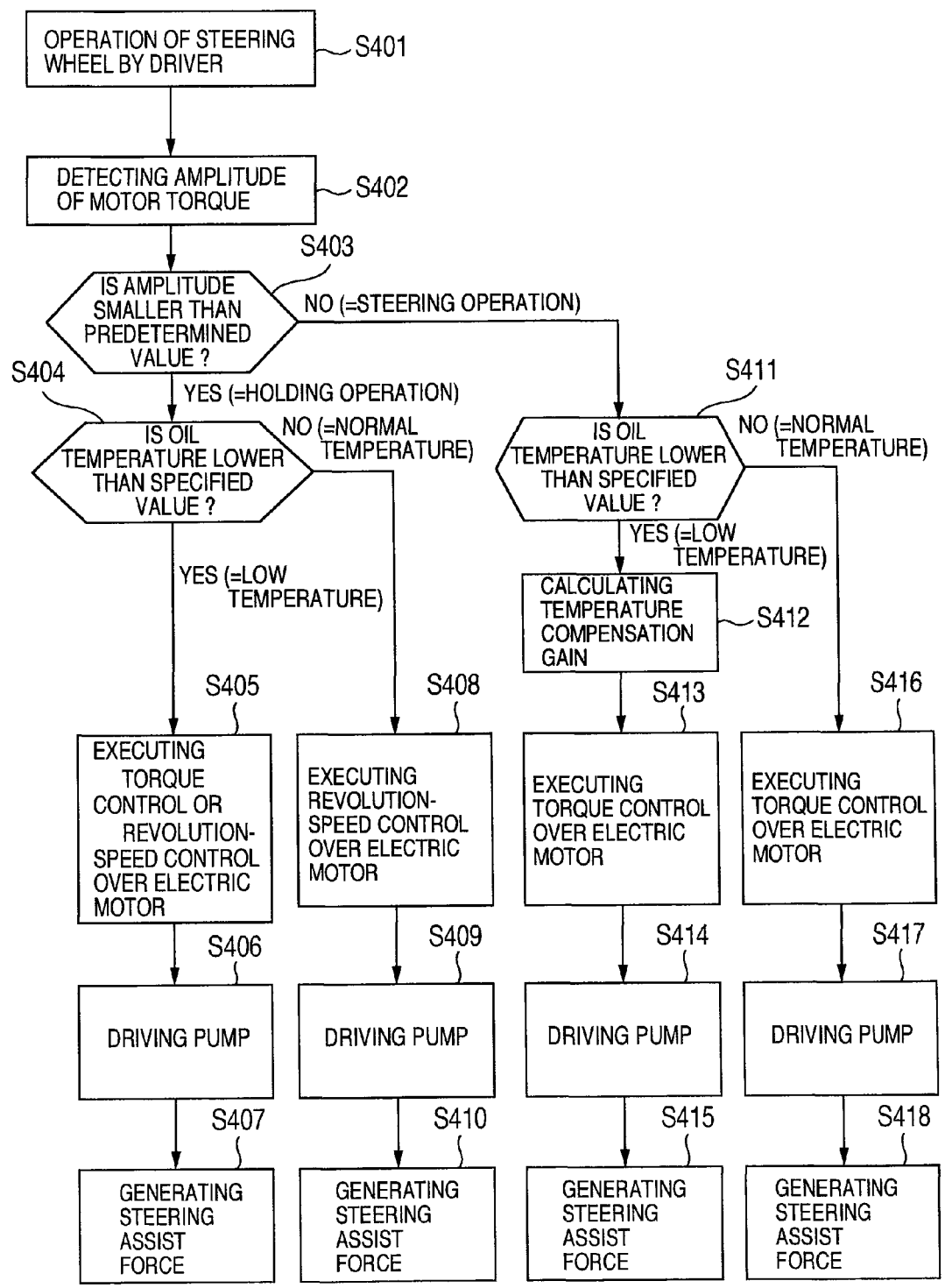

POWER STEERING SYSTEM

CROSS-REFERENCE TO RELATED APPLICATION

The present application relates to subject matters described in a co-pending U.S. patent application Ser. No. 11/144,671 filed by the inventors as same as the present application on Jun. 6, 2005 entitled "POWER STEERING APPARATUS". The disclosures of this co-pending application are incorporated herein by reference.

BACKGROUND OF THE INVENTION

The present invention relates to a power steering system for assisting a wheel steering force. More particularly, it relates to an electric-motor control method which can exhibit an effect on steering-feel improvements (i.e., assist-force enhancement and shimmy or vibration suppression) in a steering wheel.

DESCRIPTION OF THE RELATED ART

As a power assist system for assisting the wheel steering force in response to input of a steering torque from a driver, a system which uses a hydraulic mechanism is of ordinary type. As an example of this conventional technology, there exists the following one: Namely, an oil pump is driven by an electric motor so as to generate a hydraulic pressure. Then, the hydraulic pressure thus generated is controlled by a feedback of the steering torque inputted from the steering wheel, thereby generating a steering assist force. In the conventional technology, the steering torque is detected from the value of a torque sensor, and in order to generate the steering assist force corresponding to the torque, the pressure supplied to the hydraulic cylinder is controlled. In the conventional technology, regardless of the steering state, the electric motor is always controlled so that the output torque will become proportional to a current command (i.e., torque control). As a result, enough consideration has been not necessarily given to compensation for stability against a torque external-disturbance (refer to, e.g., JP-A-2003-212141 (pp. 2 to 5, FIG. 1)).

Also, an electric power steering system for assisting the steering with the use of an electric motor alone, i.e., without the use of the hydraulic mechanism, starts to prevail in its main use among small-sized cars. In this technology, at a steering switching time from a steering operation to a holding operation, or from the holding operation to the steering operation, the assist force of the electric motor is adjusted (refer to, e.g., JP-A-8-295257 (pp. 2 to 5, FIG. 2)).

SUMMARY OF THE INVENTION

In the above-described conventional technologies, such as will be described below, enough consideration has been not necessarily given to an electric-motor control method which makes it possible to simultaneously implement both an enhancement in the steering assist force and a suppression in the steering-wheel shimmy or vibration.

In general, when applying the power steering system to a heavy-weight vehicle, or when implementing a quick steering response, a large steering assist force becomes necessary. Generating the large steering assist force, however, makes it likely that a vibration system determined by appliances (electric motor, hydraulic pipe, hydraulic oil, and the like) configuring the power steering system will be excitedly vibrated. Accordingly, there exists a possibility that manifestation of the steering-wheel shimmy or vibration will be brought about.

Concretely, when steering (i.e., turning) the steering wheel into a direction moving away from the neutral angle position (i.e., vehicle's straight-ahead driving state), or conversely, when steering (i.e., turning back) the steering wheel into a direction moving toward the neutral angle position, if the steering assist force is insufficient, the steering feel becomes heavy and pasty. Accordingly, it becomes necessary to make the steering assist force larger. Meanwhile, when holding the steering wheel, in the conventional technologies, the large steering assist force makes the power steering vibration system unstable for a torque external-disturbance. This instability has resulted in a possibility that the shimmy or vibration will occur in the steering wheel.

Also, in the above-described conventional technologies, the judgment on the holding operation/steering operation is made and detected using a pulse which will occur at the time of the steering operation. As a result, when causing the steering wheel to be rotated at a very slow speed, the steering state has been judged to be the steering operation. Actually, however, when rotating the steering wheel at the very slow speed, there has existed a tendency that the self-excited vibration of the steering wheel is likely to manifest itself.

Moreover, there has existed the following problem: Namely, kinematic viscosity of the hydraulic oil for the power steering is influenced by temperature. As a result, the oil kinematic viscosity increases under a low-temperature environment. Eventually, friction inside the oil pump increases, thereby reducing the steering assist force.

It is an object of the present invention to implement an electric-motor control scheme which can exhibit an effect on an enhancement in the steering assist force and a suppression in the steering-wheel shimmy or vibration.

In order to accomplish the above-described object, when holding the steering wheel, it is required to stop the motion of a piston inside the power cylinder for generating the steering assist force, and thereby to keep constant the pressure inside the power cylinder whose volume has become fixed. In a reversible pump, the pressure is kept constant by taking advantage of the fact that a hydraulic-oil outlet amount and a hydraulic-oil leakage amount (i.e., return amount) are balanced. Consequently, the pump axis is needed to rotate at a constant rate. Here, since the reversible pump is driven by the electric motor, it is required to keep revolution of the electric motor at the constant rate.

In view of this situation, there is provided a device which, using a device for detecting steering state of wheels, makes a judgment on the steering state of the wheels between a steering operation state where wheel steering speed is larger than a predetermined value and a holding operation state where the wheel steering speed is smaller than the predetermined value. At the time of the steering operation state, the control is executed so that a difference between a torque command value to the electric motor and an actual torque thereof will become smaller. Also, at the time of the holding operation state, the control is executed so that a difference between a revolution speed of the electric motor and a revolution-speed command value thereto will become smaller.

In the judgment on the steering state of the wheels, detecting the steering speed is preferable. Otherwise, an electric motor for generating a steering reaction force for the wheels is provided on the steering shaft, then using a revolution sensor set up on the electric motor. Otherwise, the steering state may be judged to be the holding operation state when the revolution speed of the electric motor is lower than a predetermined value. Otherwise, attention may be focused on a change amount in yaw rate or transverse acceleration of the vehicle. Moreover, a speed difference between the right and left wheels may be used.

Also, it is preferable that the command value to the electric motor be corrected, depending on temperature of the hydraulic oil.

According to the present invention, there is provided the device which, using the device for detecting the steering state of the wheels, makes the judgment on the steering state of the wheels between the steering operation state where the wheel steering speed is larger than an arbitrary value and the holding operation state where the wheel steering speed is smaller than the arbitrary value. At the time of the steering operation state, the control is executed so that the difference between the torque command value to the electric motor and the actual torque thereof will become smaller. Also, at the time of the holding operation state, the control is executed so that the difference between the revolution speed of the electric motor and the revolution-speed command value thereto will become smaller. As a consequence of this control, it becomes possible to suppress the shimmy or vibration of the steering wheel.

Furthermore, it becomes possible to always output the steering assist force in a satisfactory state by making a temperature compensation where a change in the oil kinematic viscosity in response to a change in the oil temperature is taken into consideration.

Other objects, features and advantages of the invention will become apparent from the following description of the embodiments of the invention taken in conjunction with the accompanying drawings.

BRIEF DESCRIPTION OF THE DRAWINGS

FIG. 15 is a block diagram for illustrating a flow of the motor control at the time of wheels' steering-operation/holding-operation in another embodiment according to the present invention.

DESCRIPTION OF THE EMBODIMENTS

Figure 1:
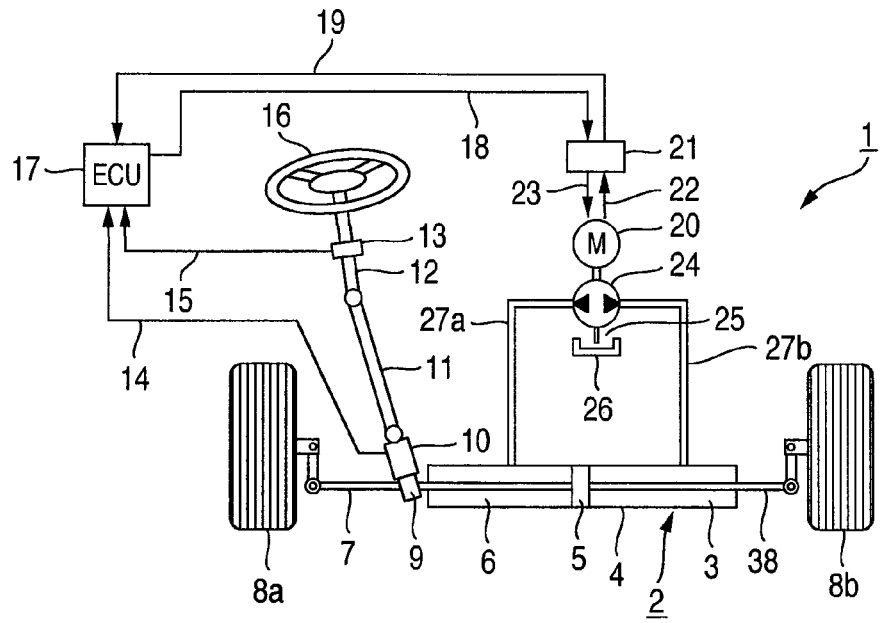
FIG. 1 is an entire diagram of a power steering system in a first embodiment according to the present invention.

Referring to FIG. 1 to FIG. 10, the explanation will be given below concerning an embodiment of the present invention. A power steering system 1 detects input of a steering torque from the driver. Then, a power steering control unit 17 calculates an assist-force command value, thereby driving an electric motor 20 to steer wheels 8a and 8b.

A steering input device includes a steering wheel 16, a steering shaft 12 and an output axis 11 coupled to the steering wheel for transmitting the steering torque therefrom, a steering-angle sensor 13 provided on the steering shaft 12, a pinion 9 provided on the output axis 11 and a steering-torque sensor 10 for detecting the steering torque, and a rack 7 engaged with the pinion 9.

A hydraulic power cylinder 2 for generating the assist force is configured such that a piston rod 28 connected to the rack 7 passes through inside a cylinder 4 extendedly provided in a vehicle-body width direction. A piston 5 slightly moving inside the cylinder 4 is fixed to the piston rod 28. Inside the cylinder 4, the piston 5 forms a right hydraulic chamber 6 and a left hydraulic chamber 3. The wheel 8a is connectedly contacted with an end portion of the piston rod 28 via the rack 7, and the wheel 8b is connectedly contacted with an end portion of the piston rod 28 via a link.

Hydraulic pipes 27a and 27b are connected to a reversible pump 24 which generates a hydraulic pressure and is capable of a forward/reverse revolution. The pipes 27a and 27b are further connected to the hydraulic chambers 6 and 3, respectively. Also, an oil tank 26 for storing a hydraulic oil is connected to the reversible pump 24 via a supply channel 25. This oil tank 26 is configured to be able to collect the hydraulic oil which leaks from the reversible pump 24. Here, revolution axis of the reversible pump 24 is coupled to the electric motor 20, and the electric motor 20 rotates by receiving a command current from a motor driver 21. This allows the reversible pump 24 to be driven in the forward/reverse-revolution capable manner.

The power steering control unit 17 is connected to the steering-torque sensor 10 via a steering-torque signal line 14, the steering-angle sensor 13 via a steering-angle signal line 15, and the motor driver 21 via a command-value signal line 18 and a motor revolution-speed signal line 19, respectively. In the power steering control unit 17, the judgment on the steering operation/holding operation is made based on steering-angle information, thereby switching the control over the electric motor 20. Moreover, a command value to the electric motor 20 is calculated based on the steering torque that the driver inputs by operating the steering wheel 16. Furthermore, the command value thus crated is transmitted to the motor driver 21 via the command-value signal line 18, then being further inputted into the electric motor 20 via a driver output cable 23. The detailed explanation of these processes will be given later by using FIG. 2 to FIG. 8.

Figure 2:
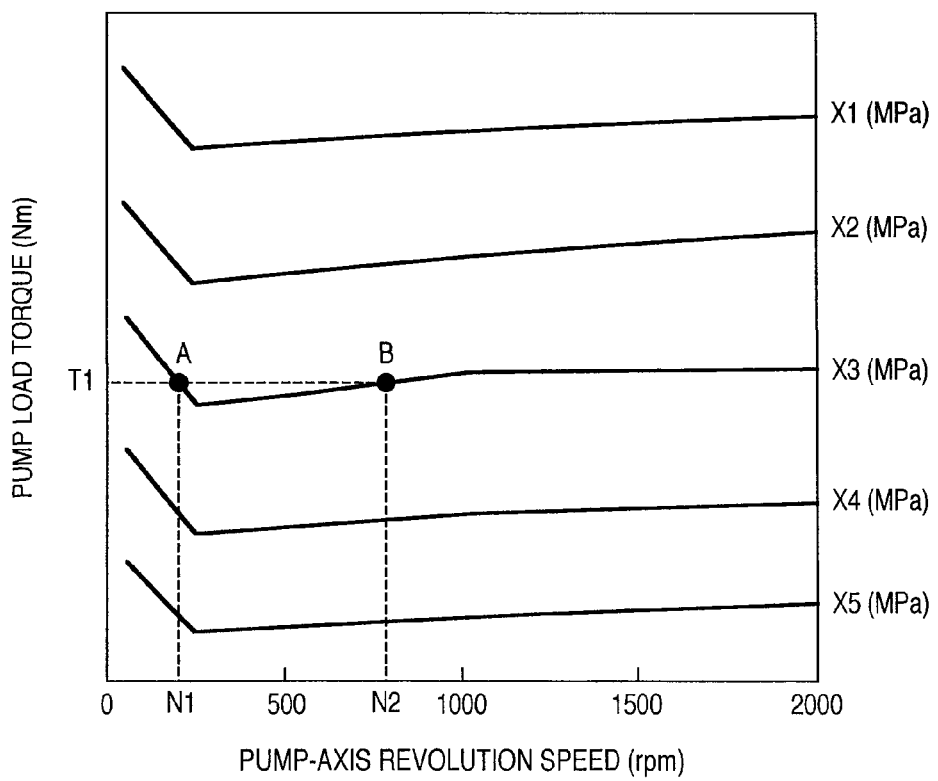
FIG. 2 is a graph for illustrating pump load characteristics in the first embodiment according to the present invention.

Next, referring to FIG. 2, the explanation will be given below concerning load torque characteristics of the pump. Here, assume that the transverse axis of the graph denotes pump revolution speed (rpm), and the longitudinal axis of the graph denotes load torque (Nm) of the pump axis. A plurality of lines in the drawing are constant-pressure lines each, and are assumed to be X1>X2>X3>X4>X5 in this order. In an ordinary driving area, the higher the pump revolution speed becomes, the larger the pump load torque becomes. In a low-revolution area of 500 rpm or less, however, liquid lubrication inside the pump is not maintained satisfactorily. As a result, the friction increases, and thus the pump load torque tends to increase. For example, as the pump revolution speed corresponding to the pump load torque of T1 (Nm) on X3 (MPa), two points, i.e., A and B, exist as are illustrated in the drawing. Accordingly, the pump revolution speed can take on two values, i.e., N1 and N2. In a situation like this, executing a revolution-speed control over the electric motor is required for stabilizing the revolution speed of the electric motor.

Figure 3:
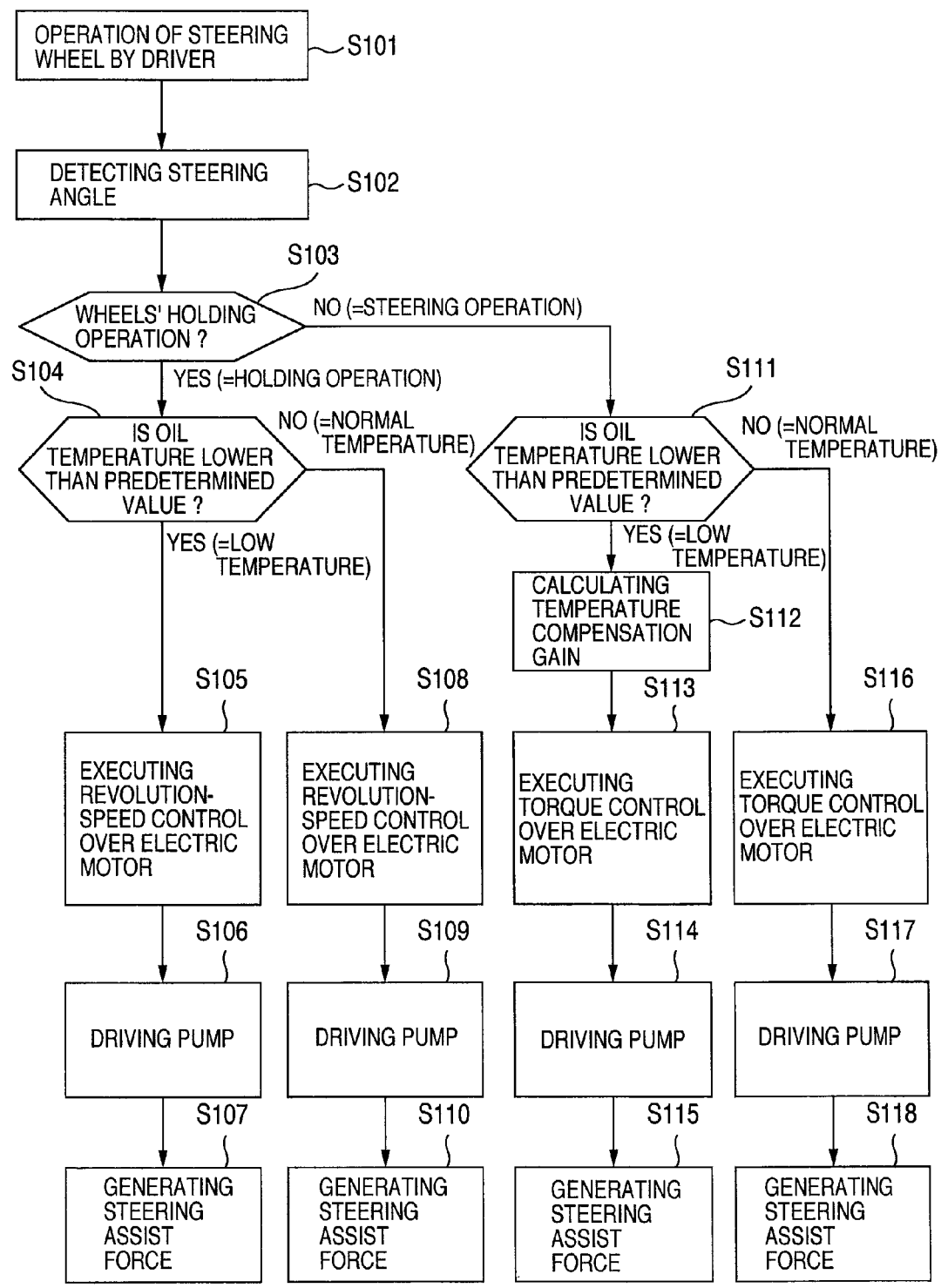
FIG. 3 is a block diagram for illustrating a flow of motor control at the time of wheels' steering-operation/holding-operation according to the present invention.

Next, referring to FIG. 3, the explanation will be given below concerning outline of an electric-motor control flow corresponding to the wheels' steering-operation/holding-operation in the present embodiment. If, at a step S101, the driver operates the steering wheel 16, the steering-angle sensor 13 detects the steering angle (step S102). At a step S103, the judgment on the wheels' steering-operation/holding-operation is made using a method which will be explained later in FIG. 4 and FIG. 5.

First, if the wheel steering state has been judged to be the wheel holding operation, the control proceeds to a step S104. At this step, it is judged whether or not the oil temperature of the power steering is lower than a predetermined value. Here, if it is judged that the oil temperature of the power steering is lower than the predetermined value, the oil is judged to be in a low-temperature state. Accordingly, at a step S105, a control is executed such that the revolution speed of the electric motor 20 becomes equal to a command speed (i.e., revolution-speed control). By the motor over which the revolution-speed control has been executed, the axis of the reversible pump 24 is driven at a constant revolution at a step S106. This driving generates a steering assist force (step S107). Incidentally, at the low-temperature time, as will be explained later in FIG. 10, oil kinematic viscosity increases, thereby increasing attenuation of the pump hydraulic system. As a result, the shimmy or vibration tends to be suppressed. Consequently, at the step S105, the control may also be executed such that output torque of the electric motor 20 becomes proportional to a command current (i.e., torque control).

Next, at the step S104, if it is judged that the oil temperature of the power steering is higher than the predetermined value, at a step S108, the revolution-speed control is executed over the electric motor 20. Then, at a step S109, the pump is driven in response to the driving of the motor. As a result, at a step S110, the steering assist force is generated.

Figure 10:
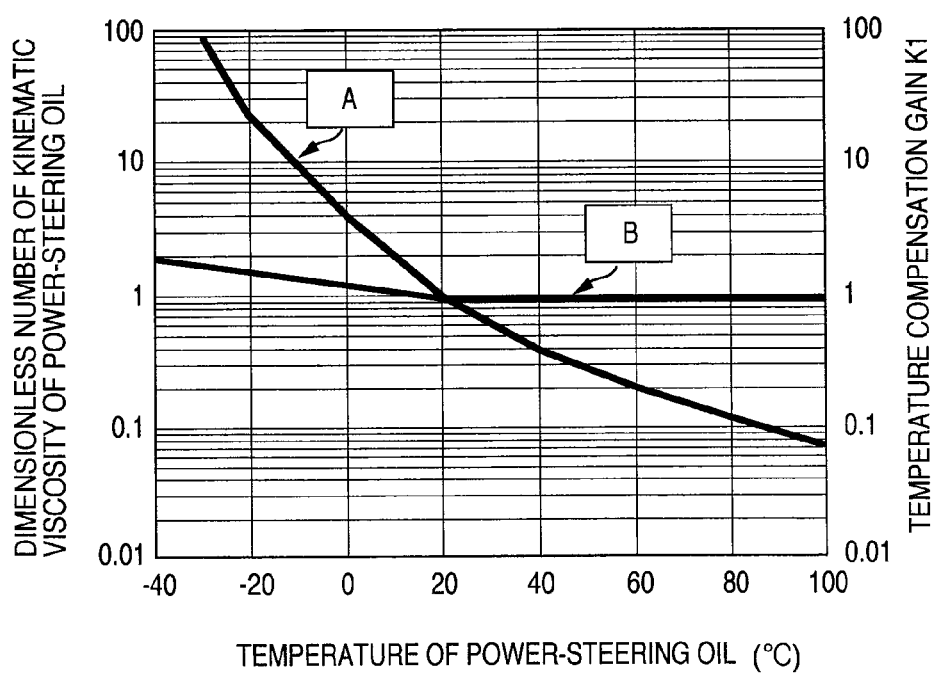
FIG. 10 is a graph for illustrating an example of a temperature compensation gain K1 in the first embodiment according to the present invention.

Meanwhile, at the step S103, if the wheel steering state has been judged to be the wheel steering operation, the control proceeds to a step S111. At this step, it is judged whether or not the oil temperature of the power steering is lower than the predetermined value. Here, if it is judged that the oil temperature of the power steering is lower than the predetermined value, the oil is judged to be in the low-temperature state. Accordingly, at a step S112, a temperature compensation gain K1, which will be explained later in FIG. 10, is calculated. Moreover, the control proceeds to a step S113, where the torque control is executed over the electric motor 20. By the motor over which the torque control has been executed, the axis of the reversible pump 24 is driven at a step S114. This driving generates the steering assist force (step S115). Also, at the step S111, if it is judged that the oil temperature of the power steering is higher than the predetermined value, at a step S116, the torque control is executed over the electric motor 20. Then, at a step S117, the pump is driven in response to the driving of the motor. As a result, at a step S118, the steering assist force is generated.

Figure 4:
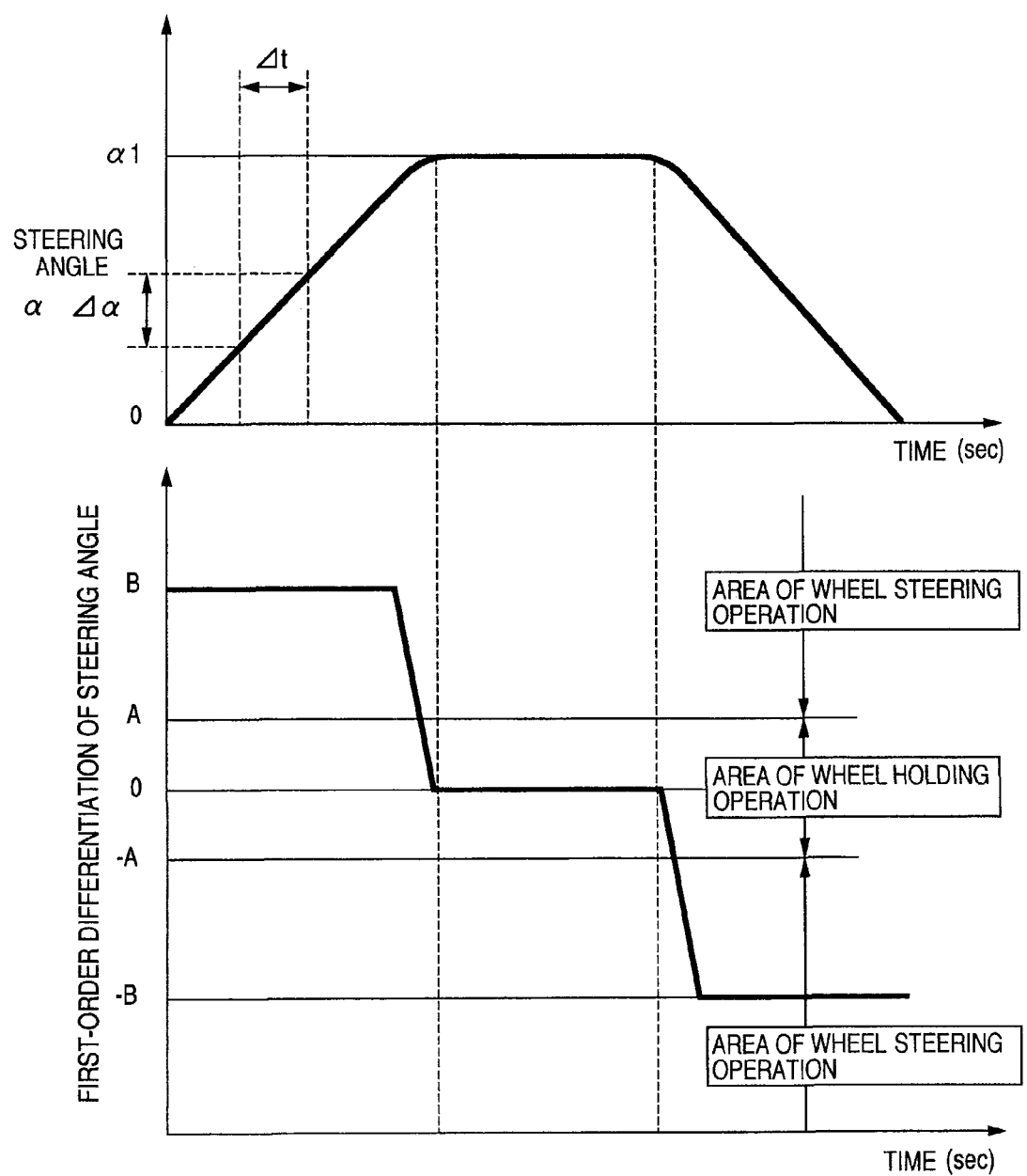
FIG. 4 is a diagram for illustrating a judgment method at the time of the wheels' steering-operation/holding-operation according to the present invention.
Figure 5:
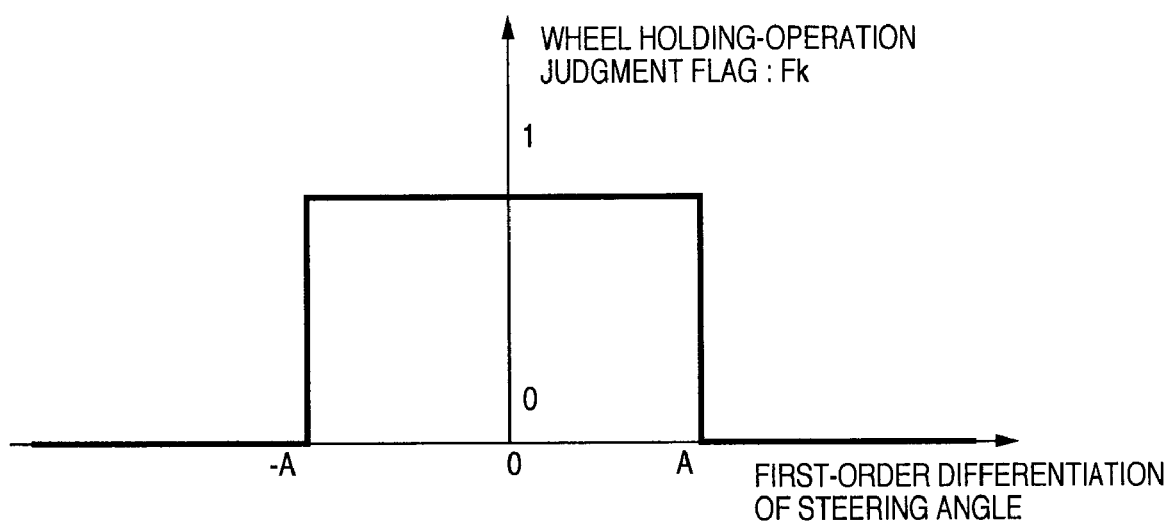
FIG. 5 is a diagram for illustrating setting of a judgment flag at the time of the wheels' steering-operation/holding-operation according to the present invention.

Next, referring to FIG. 4 and FIG. 5, the explanation will be given below regarding a judgment method for judging the wheels' steering-operation/holding-operation. FIG. 4 schematically illustrates time variation in steering angle and time variation in first-order differentiation of the steering angle. The steering condition here is as follows: Namely, the steering wheel is turned from the neutral position (i.e., vehicle's straight-ahead driving state) to a steering angle $\alpha_1$ at a constant steering speed. After that, the steering wheel is returned to the neutral position at the constant steering speed. At this time, the first-order differentiation $\alpha'$ of the steering angle can be determined by the following expression:

$$\alpha' = \Delta\alpha/\Delta t \quad (1)$$

In the case of FIG. 4, when the steering wheel is turned from the neutral position (i.e., vehicle's straight-ahead driving state) at the constant steering speed, $\alpha'$ becomes equal to the constant value B. When the steering wheel is returned, $\alpha'$ becomes equal to the constant value −B. Also, at the time of the holding operation, $\alpha'$ becomes equal to zero, i.e., $\alpha'=0$. When the steering operation is transitioned to the holding operation, $\alpha'$ becomes equal to values which are acquired by the interpolation between B and 0. Accordingly, as illustrated in the drawing, setting threshold values ±A makes it possible to divide the area of the wheels' steering-operation/holding-operation. Setting the threshold values ±A in this way turns out to execute the revolution-speed control over the electric motor 20 even when the steering wheel is rotated at the very slow speed. Also, for practical convenience of the electric-motor control, it is preferable to use a wheel holding-operation judgment flag Fk as is illustrated in FIG. 5. The flag Fk is set such that the flag Fk becomes equal to 1 when the first-order differentiation $\alpha'$ of the steering angle assumes a value indicated by the following expression:

$$-A \leq \alpha' \leq A \quad (2)$$

Figure 6:
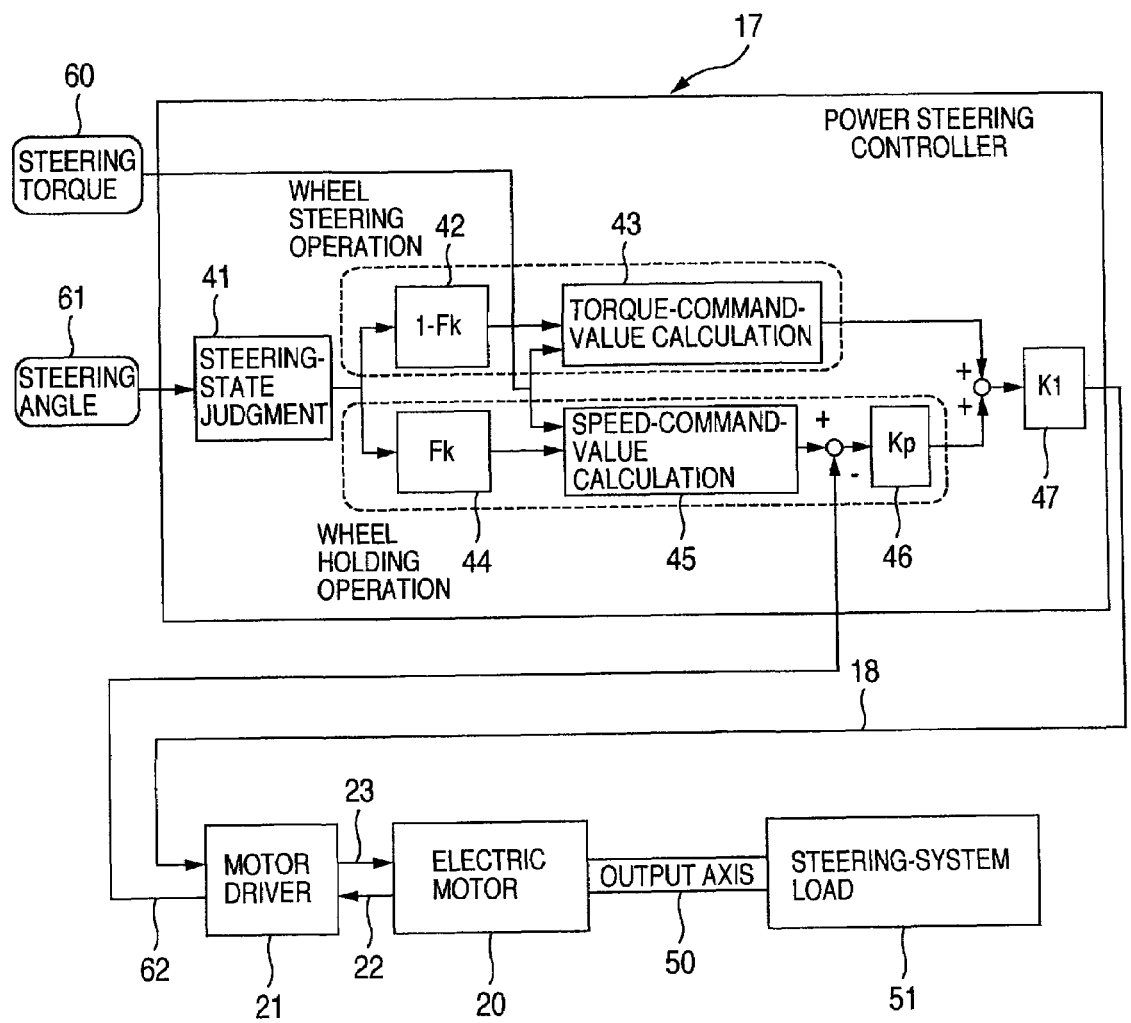
FIG. 6 is a flowchart diagram for illustrating creation flow of a motor command value inside a power steering control unit according to the present invention.

Next, referring to FIG. 6, the explanation will be given below concerning an embodiment of the creation method for creating a command value to the electric motor 20 in the power steering controller 17. In the power steering controller 17, a steering-angle signal 61 is inputted into a steering-state judgment block 41, where the holding-operation judgment flag Fk is calculated. For example, if the wheel steering state has been judged to be a wheel steering operation, the value of a steering-operation flag 42 becomes 1−Fk=1 because of Fk=0. As a result, the torque command control will be selected. Based on map information prepared in advance and illustrated schematically in FIG. 8, a torque-command-value calculation block 43 calculates a torque command value by using a steering-torque signal 60. The torque command value thus calculated is inputted into the motor driver 21 via the command-value signal line 18. In the motor driver 21, a control system which will be explained later in FIG. 7 executes the torque control, using an armature current detected via a motor revolution-speed/armature current signal line 22. A steering-system load 51 such as the reversible pump is coupled to the output axis 50 of the electric motor 20, and is driven by the electric motor 20. Meanwhile, if the wheel steering state has been judged to be a wheel holding operation, the value of a holding-operation flag 44 becomes Fk=1 because of Gk=1. As a result, the revolution-speed control will be selected. Based on map information prepared in advance and illustrated schematically in FIG. 9, a speed-command-value calculation block 45 calculates a revolution-speed command value by using the steering-torque signal 60. A deviation between the revolution-speed command value and a motor revolution speed detected via a motor revolution-speed signal line 62 is calculated in a proportion gain 46, then being inputted into the motor driver 21 via the command-value signal line 18. In the motor driver 21, the revolution-speed control is executed. Incidentally, in order to compensate for influences by a change in the oil kinematic viscosity in accompaniment with a change in the power-steering oil temperature, it is preferable to set the temperature compensation gain K1, which will be explained later in FIG. 10.

Figure 7:
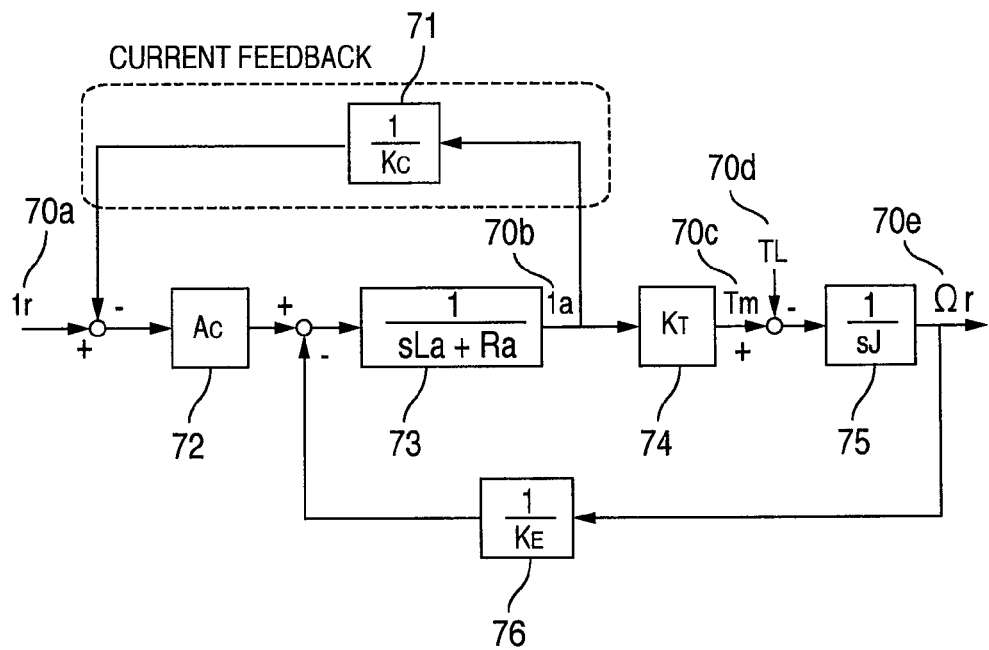
FIG. 7 is a diagram for illustrating a motor driver and an electric motor according to the present invention with a block-line diagram.
Figure 8:
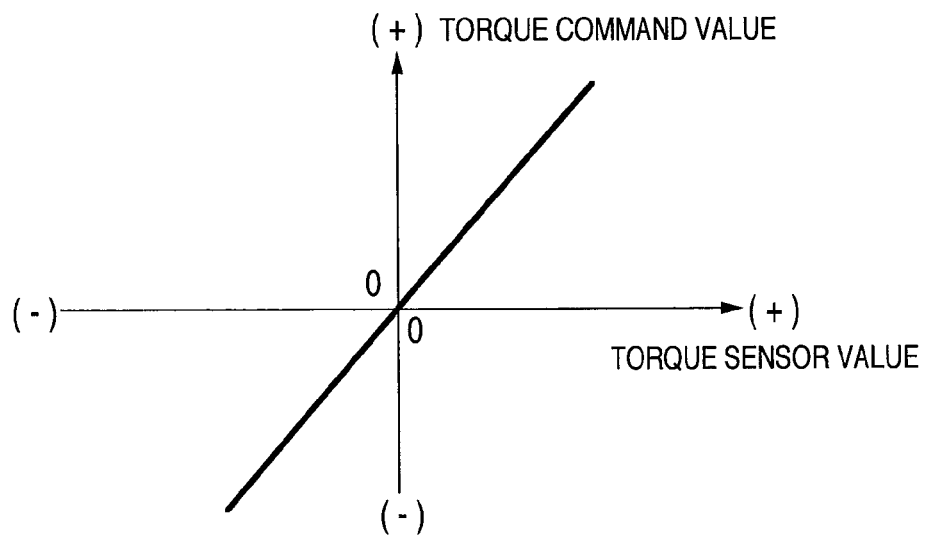
FIG. 8 is a diagram for illustrating an example of creation map of a torque command value according to the present invention.
Figure 9:
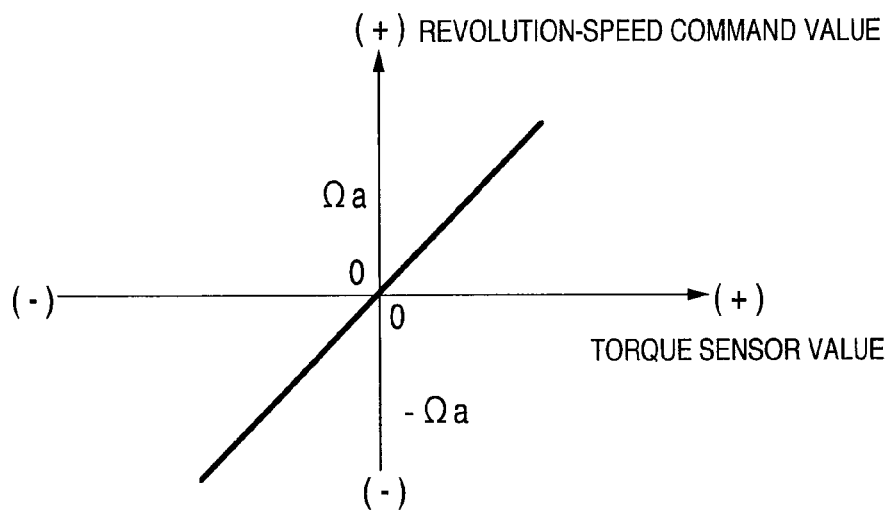
FIG. 9 is a diagram for illustrating an example of creation map of a revolution-speed command value according to the present invention.

Next, referring to FIG. 7, the explanation will be given below regarding the principle of the torque control executed in the motor driver 21. FIG. 7 illustrates a general control block-line diagram of the electric motor 20 and the motor driver 21. Reference is made to, e.g., Hiroshi Ogino, "How to Use Brushless DC Motor" (Ohmsha Corp. pp. 16-17).

In FIG. 7, the respective reference notations denote the following contents:
Ac: current amplifier
La: armature inductance
Ra: armature resistance
$K_T$: torque constant
J: motor-axis inertia
1/Kc: current detector
$K_E$: induced-voltage constant
Also, 1/s denotes integration operation.

A difference between a current command value 70a and an armature current 70b from the current feedback loop is inputted into a current amplifier 72. Then, an induced voltage which is proportional to a revolution speed 70e of the motor axis is determined by an induced-voltage constant block 76. Moreover, a difference between the current command value 70a and the induced voltage is inputted into an armature resistance/inductance characteristics block 73. This creates the armature current 70b, and allows a torque constant block 74 to determine a torque 70c which the electric motor 20 will generate. Furthermore, in a motor-axis inertia block 75, the motor-axis revolution speed 70e is determined based on a difference between the torque 70c and an external-disturbance torque 70d. In the configuration as described above, by making the value of the current amplifier 72 exceedingly large, it becomes possible to flow the armature current 70b which is proportional to the current command value 70a. Consequently, it turns out that the torque 70c also becomes proportional to the current command value 70a. This allows the torque control to be executed.

FIG. 10 is a graph for illustrating an example of the temperature compensation gain K1. The transverse axis in the graph denotes the temperature of the power-steering oil. The longitudinal axis at the left denotes a value (plotted by the line A) which is obtained by making the kinematic viscosity of the power-steering oil dimensionless with the value of the kinematic viscosity at a normal-temperature time (i.e., 20 □) set at 1. The longitudinal axis at the right denotes the temperature compensation gain K1 (plotted by the line B). The lower the temperature of the power-steering oil becomes, the larger the kinematic viscosity becomes. This fact gives rise to an increase in friction loss in the components of the power steering system such as the pump unit and pipes. Accordingly, in order to compensate for a lowering in the steering force due to the friction loss, it is preferable to set the temperature compensation gain K1 as is indicated by the line B. This setting makes it possible to obtain a steering force which is substantially equal to the steering force at the normal-temperature time even in the case where the temperature of the power-steering oil is low. Consequently, this setting becomes effective in reducing a sense of strangeness in the steering.

As a result of using the power steering system 1 of the present embodiment configured as described above, the following effects can be obtained: First, at the time of the steering operation, the torque control is executed over the electric motor 20, thereby driving the reversible pump 24. Meanwhile, at the time of the holding operation, the revolution-speed control is executed over the electric motor 20. This drives the reversible pump 24 at the constant revolution. Namely, the outlet pressure of the reversible pump 24 is kept constant, which suppresses the self-excited vibration of the steering wheel 16.

Although, in the present embodiment, the power steering controller 17 and the motor driver 21 are formed in a separate manner, these units may also be formed in an integrated manner. In this integrated case, downsizing the system becomes implementable. This fact allows an enhancement in the on-board property onto the vehicle. Also, in substitution for the steering-angle sensor 13 for judging the steering state, a sensor may also be used which is designed for detecting, e.g., stroke of the piston rod 28. This is effective if there exists no enough available space in proximity to the steering wheel 16.

Necessary confirmation steps for confirming that the present embodiment has been carried out are as follows: Namely, the coupling between the motor driver 21 and the motor revolution-speed signal line 19 is released. Then, instead of a motor revolution-speed signal from the motor driver 21, a constant voltage is applied, for example. In this case, by monitoring the command value via the command-value signal line 18, confirming the following condition is preferable: In the steering operation state, the command value does not change even if the applied voltage is increased; whereas, in the holding operation state, the command value increases in accompaniment with the increase in the applied voltage. Also, by measuring the revolution speeds of the electric motor 20 at the times of the steering operation and holding operation, confirming the following condition is preferable: At the steering operation time, there occurs a variation in the motor revolution speed; whereas, at the holding operation time, the motor revolution speed is constant.

Figure 11:
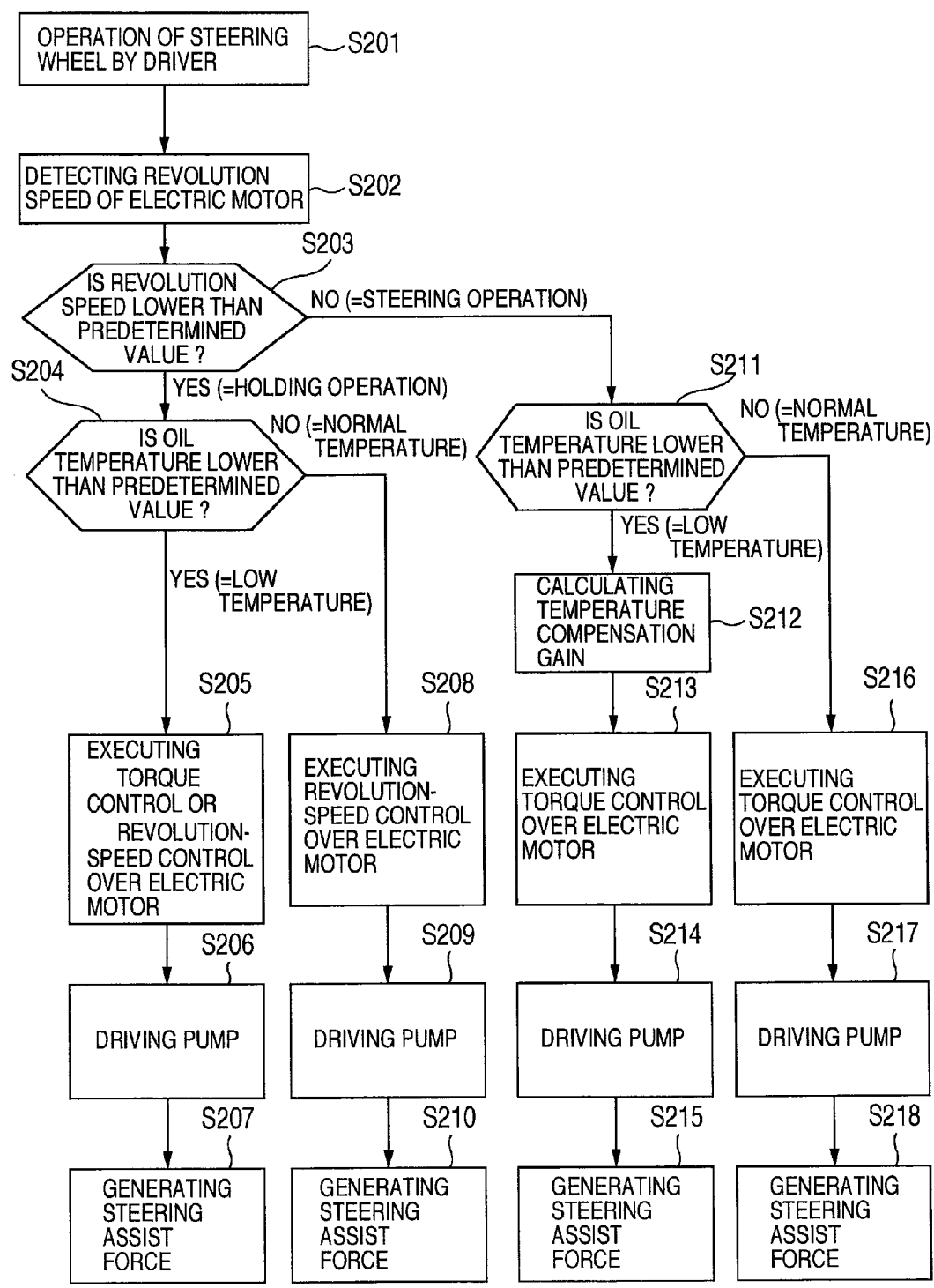
FIG. 11 is a block diagram for illustrating a flow of the motor control at the time of wheels' steering-operation/holding-operation in another embodiment according to the present invention.

Next, referring to FIG. 11, the explanation will be given below concerning another embodiment of the present invention. FIG. 11 is an electric-motor control flow corresponding to the wheels' steering-operation/holding-operation according to another embodiment of the present invention. If, at a step S201, the driver operates the steering wheel 16, revolution speed of the electric motor is detected (step S202). Then, at a step S203, if the revolution speed of the electric motor is lower than a predetermined value, the wheel steering state is judged to be the wheel holding operation. Meanwhile, if the revolution speed is higher than the predetermined value, the state is judged to be the wheel steering operation. Since the other configurations are basically the same as the ones in the first embodiment, the explanation thereof will be omitted.

Figure 12:
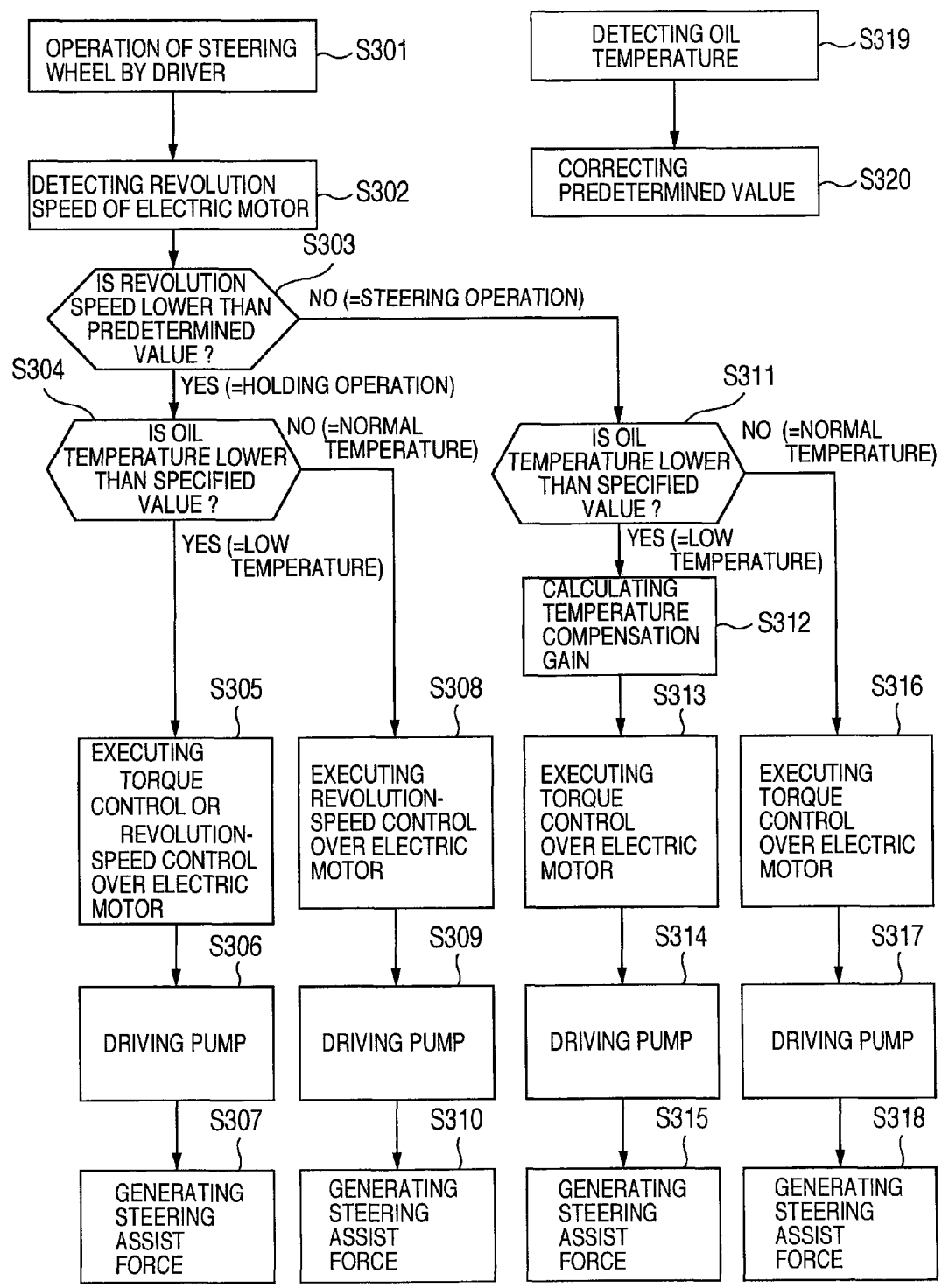
FIG. 12 is a block diagram for illustrating a flow of the motor control at the time of wheels' steering-operation/holding-operation in another embodiment according to the present invention.

Next, referring to FIG. 12, the explanation will be given below regarding still another embodiment of the present invention. FIG. 12 is an electric-motor control flow corresponding to the wheels' steering-operation/holding-operation according to still another embodiment of the present invention. If, at a step S301, the driver operates the steering wheel 16, revolution speed of the electric motor is detected (step S302). Here, by a step S319 which is separately provided, temperature of the power-steering oil is detected. Moreover, at a step S320, the predetermined value is corrected. Then, based on the predetermined value corrected, at a step S303, if the revolution speed of the electric motor is lower than the predetermined value, the wheel steering state is judged to be the wheel holding operation. Meanwhile, if the revolution speed is higher than the predetermined value, the state is judged to be the wheel steering operation. Here, when correcting the predetermined value, it is preferable to correct the predetermined value such that the predetermined value is increased in amount as the oil temperature is higher. Also, at the step S302, the revolution speed of the electric motor has been detected. In substitution therefor, however, the quantities, such as yaw rate of the vehicle, transverse acceleration thereof, and a speed difference between the right and left wheels, may also be detected and used for the judgment on the holding operation/steering operation. Furthermore, at the step S302, the judgment may also be made from a plurality of physical quantities. For example, the oil temperature, hydraulic pressure, and pump revolution speed are detected, and the judgment on the holding operation/steering operation may be made in accordance with a pump characteristics map created in advance. Since the other configurations are basically the same as the ones in the first embodiment, the explanation thereof will be omitted.

Figure 13:
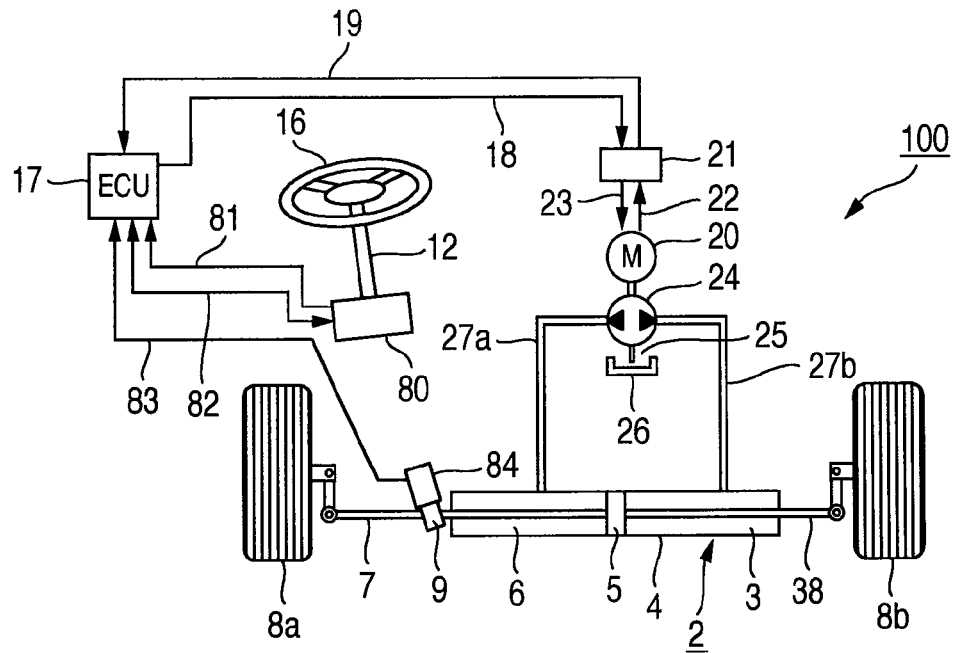
FIG. 13 is an entire diagram of the power steering system in another embodiment according to the present invention.

Next, referring to FIG. 13, the explanation will be given below concerning still another embodiment of the present invention. In a power steering system 100, a steering input device includes the steering wheel 16, the steering shaft 12 coupled to the steering wheel for transmitting the steering torque therefrom, and a steering-reaction-force generating simulator 80.

In substitution for the steering-angle sensor 13 and the steering-torque sensor 10 of the first embodiment, the power steering control unit 17 detects the steering angle from the steering-reaction-force generating simulator 80 via a steering-angle signal line 81, and detects an actual steering angle from an actual steering angle sensor 84 via a steering-torque signal line 83. Then, based on this detection, the control unit 17 calculates a command value to the electric motor 20. The point in which the present embodiment differs from the first embodiment is that the present embodiment is a steer-by-wire system which does not use a mechanical connection between the steering wheel 16 and the pinion gear 9. Namely, in this system, the steering force inputted from the steering wheel 16 will not be directly transmitted to the pinion 9. In the steer-by-wire system, it is required to generate the steering reaction force which could be generated and propagated from the wheels 8a and 8b. Accordingly, in order to generate a pseudo-steering reaction force, the power steering control unit 17 is so configured as to input a reaction-force command value into a motor in the steering-reaction-force generating simulator 80 via a reaction-force command signal line 82. In the present embodiment, a vibration-adding force from road surface will not be directly transmitted to the steering wheel 16. Consequently, the present embodiment is effective in enhancing the steering feel. Since the other configurations are basically the same as the ones in the first embodiment, the explanation thereof will be omitted.

Figure 14:
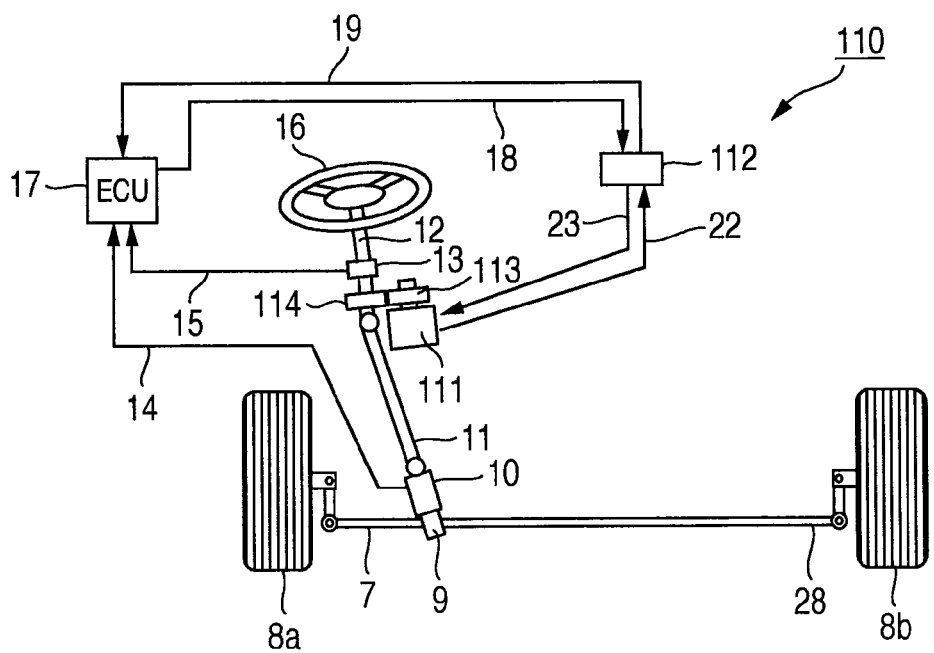
FIG. 14 is an entire diagram of the power steering system in another embodiment according to the present invention.

Next, referring to FIG. 14, the explanation will be given below concerning still another embodiment of the present invention. In a power steering system 110, an electric motor 111 receives a command from a motor driver 112, thereby generating a steering assist force via a gear wheel A113 set up on the motor axis, and a gear wheel B114 set up on the steering shaft 12 and engaged with the gear wheel A113.

The feature of the present embodiment is as follows: Namely, at the time of the holding operation, the revolution-speed control is executed so that the revolution of the electric motor 111 will stop.

The point in which the present embodiment differs from the first embodiment is as follows: Namely, in the present embodiment, the steering assist force is generated with the use of the electric motor alone, i.e., without the use of the hydraulic mechanism. As a result, the present embodiment necessitates only the small number of configuration components, and is effective in implementation of the cost lowering, space saving, and light-weighting of the system. Since the other configurations are basically the same as the ones in the first embodiment, the explanation thereof will be omitted.

Necessary confirmation steps for confirming that the present embodiment has been carried out are as follows: Namely, the coupling between the motor driver 21 and the motor revolution-speed signal line 19 is released. Then, instead of a motor revolution-speed signal from the motor driver 112, a constant voltage is applied, for example. In this case, by monitoring the command value via the command-value signal line 18, confirming the following condition is preferable: In the steering operation state, the command value does not change even if the applied voltage is increased; whereas, in the holding operation state, the command value increases in accompaniment with the increase in the applied voltage. Also, by measuring the revolution speeds of the electric motor 20 at the times of the steering operation and holding operation, confirming the following condition is preferable: At the steering operation time, there occurs a variation in the motor revolution speed; whereas, at the holding operation time, the motor revolution speed stops.

Next, referring to FIG. 15, the explanation will be given below regarding still another embodiment of the present invention. FIG. 15 is an electric-motor control flow corresponding to the wheels' steering-operation/holding-operation according to still another embodiment of the present invention. If, at a step S401, the driver operates the steering wheel 16, amplitude of the electric-motor torque is detected (step S402). Next, at a step S403, if the amplitude of the electric-motor torque is smaller than a predetermined value, the wheel steering state is judged to be the holding operation. Meanwhile, if the amplitude is larger than the predetermined value, the state is judged to be the steering operation. Incidentally, at the step S402, in substitution for the electric-motor torque, such quantities as amplitude of the electric-motor revolution speed and amplitude of the hydraulic pressure may also be used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power steering system, comprising:
    a hydraulic power cylinder for assisting a steering force of a steering mechanism connected to wheels, and having a first hydraulic chamber and a second hydraulic chamber,
    a first pathway connected to said first hydraulic chamber,
    a second pathway connected to said second hydraulic chamber,
    a reversible pump having a pair of outlet openings continuously connected to said first pathway and said second pathway, said reversible pump selectively supplying an outlet pressure to said pair of outlet openings, an electric motor for revolving said reversible pump in a forward/reverse direction, steering-load detection means for detecting or estimating steering load of a steering wheel for executing a steering control over said wheels, steering-speed detection means for detecting or estimating steering speed of said wheels, and motor control means for outputting, based on said steering load, a driving signal to said electric motor so as to causing said electric motor to generate a desirable hydraulic pressure, said motor control means also executing a torque control over said electric motor if said steering speed is higher than a predetermined value so that a difference between a torque command value of said driving signal and an actual torque of said electric motor becomes smaller, and executing a control over said electric motor based on revolution speed of said electric motor if said steering speed is lower than said predetermined value so that a difference between a revolution speed command valued of said driving signal and an actual revolution speed of said electric motor becomes smaller.

2. The power steering system according to claim 1, further comprising:

an oil-temperature sensor for detecting or estimating oil temperature of a hydraulic oil inside said system, a revolution-speed sensor for detecting said revolution speed of said electric motor or revolution speed of said reversible pump, and a hydraulic-pressure sensor for detecting or estimating said hydraulic pressure inside said hydraulic power cylinder, and wherein said steering-speed detection means estimates said steering speed of said wheels based on said oil temperature, said revolution speed, and said hydraulic pressure.

3. A power steering system, comprising:

a hydraulic power cylinder for assisting a steering force of a steering mechanism connected to wheels and having a first hydraulic chamber and a second hydraulic chamber, a first pathway connected to said first hydraulic chamber, a second pathway connected to said second hydraulic chamber, a reversible pump having a pair of outlet openings continuously connected to said first pathway and said second pathway, said reversible pump selectively supplying an outlet pressure to said pair of outlet openings, an electric motor for revolving said reversible pump in a forward/reverse direction, steering-load detection means for detecting or estimating steering load of a steering wheel for executing a steering control over said wheels, revolution-speed detection means for detecting or estimating revolution speed of said electric motor or said reversible pump, and motor control means for outputting, based on said steering load, a driving signal to said electric motor so as to causing said electric motor to generate a desirable hydraulic pressure, said motor control means also executing a torque control over said electric motor if said revolution speed is not lower than a predetermined value so that a difference between a torque command value of said driving signal and an actual torque of said electric motor becomes smaller, and executing a control over said electric motor based on said revolution speed of said electric motor if said revolution speed of said electric motor is lower than said predetermined value so that a difference between a revolution speed command value of said driving signal and an actual revolution speed of said electric motor becomes smaller.

4. The power steering system according to claim 3, wherein said electric motor is a brushless motor having a revolution-position sensor for detecting revolution position of a rotor, said revolution-speed detection means estimating said revolution speed of said electric motor based on a sensor output detected by said revolution-position sensor.

5. The power steering system according to claim 3, wherein said electric motor is a brush-attached motor, said motor-speed detection means estimating said revolution speed of said electric motor based on actual current value and actual voltage value of said electric motor.

6. The power steering system according to claim 3, further comprising:

a vehicle-speed sensor for detecting driving speed of said vehicle, and wherein said motor control means executes said torque control over said electric motor regardless of said revolution speed of said electric motor, if said driving speed of said vehicle detected by said vehicle-speed sensor is higher than a predetermined value.

7. The power steering system according to claim 3, wherein said predetermined value has a hysteresis, value of said hysteresis being corrected after a state where a steering speed is higher has changed to a state where said steering speed is lower and after said state where said steering speed is lower has changed to said state where steering speed is higher.

8. The power steering system according to claim 3, further comprising:

a vehicle-speed sensor for detecting driving speed of said vehicle, and wherein said predetermined value is corrected based on said driving speed of said vehicle detected by said vehicle-speed sensor.

9. The power steering system according to claim 3, further comprising:

an oil-temperature sensor for detecting or estimating oil temperature of a hydraulic oil inside said system, and wherein said predetermined value is corrected based on said oil temperature.

10. The power steering system according to claim 9, wherein said predetermined value is corrected to a larger value as said oil temperature becomes higher.

11. The power steering system according to claim 3, further comprising:

a hydraulic-pressure sensor for detecting or estimating said hydraulic pressure of said hydraulic power cylinder, and wherein said predetermined value is corrected based on said hydraulic pressure.

12. The power steering system according to claim 4, further comprising:

an oil-temperature sensor for detecting or estimating oil temperature of a hydraulic oil inside said system, and wherein said motor control means executes a driving control over said electric motor so that actual current value of said electric motor becomes larger as said oil temperature becomes higher.

13. A power steering system, comprising:
a hydraulic power cylinder for assisting a steering force of a steering mechanism connected to wheels, and having a first hydraulic chamber and a second hydraulic chamber,
a first pathway connected to said first hydraulic chamber,
a second pathway connected to said second hydraulic chamber,
a reversible pump having a pair of outlet openings continuously connected to said first pathway and said second pathway, said reversible pump selectively supplying an outlet pressure to said pair of outlet openings,
an electric motor for revolving said reversible pump in a forward/reverse direction,
steering-load detection means for detecting or estimating steering load of a steering wheel for executing a steering control over said wheels,
a hydraulic-pressure sensor for detecting a hydraulic pressure inside said system, and
motor control means for outputting, based on said steering load, a driving signal to said electric motor so as to causing said electric motor to generate a desirable hydraulic pressure,
said motor control means also executing a torque control over said electric motor if a change quantity of said hydraulic pressure is larger than a predetermined value, and executing a control over said electric motor based on revolution speed of said electric motor if said change quantity of said hydraulic pressure is smaller than said predetermined value.

* * * * *

UNITED STATES PATENT AND TRADEMARK OFFICE
CERTIFICATE OF CORRECTION

| | | |
|---|---|---|
| PATENT NO. | : 7,631,722 B2 | Page 1 of 1 |
| APPLICATION NO. | : 11/624286 | |
| DATED | : December 15, 2009 | |
| INVENTOR(S) | : Ayumu Miyajima et al. | |

It is certified that error appears in the above-identified patent and that said Letters Patent is hereby corrected as shown below:

Title Page, Item (73) should read

-- (73) Assignee: HITACHI, LTD, Tokyo, Japan --.

Signed and Sealed this

Seventeenth Day of May, 2011

David J. Kappos
*Director of the United States Patent and Trademark Office*